W. P. PENN.
Grain Drill.
No. 29,191. Patented July 17, 1860.
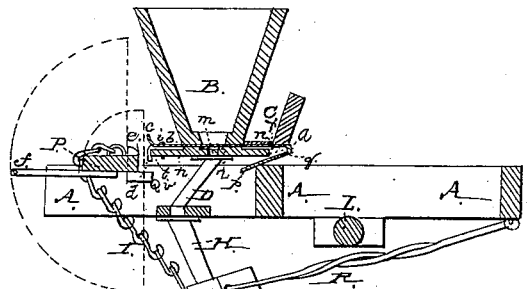
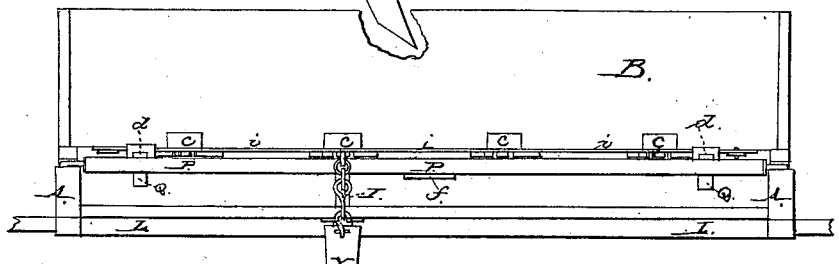
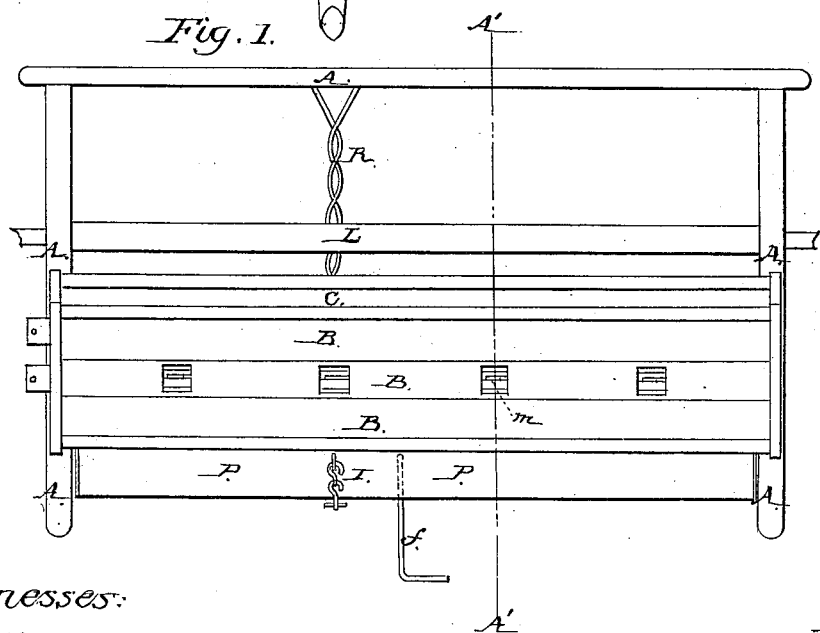

UNITED STATES PATENT OFFICE.

WORDEN P. PENN, OF BELLEVILLE, ILLINOIS.

IMPROVEMENT IN SEEDING-MACHINES.

Specification forming part of Letters Patent No. 29,191, dated July 17, 1860.

*To all whom it may concern:*

Be it known that I, WORDEN P. PENN, of Belleville, in the county of St. Clair and State of Illinois, have invented a new and useful Improvement in Seed-Planters; and I do hereby declare that the following is a full, clear, and exact description of the same, reference being had to the annexed drawings, making part of this specification, in which—

Figure 1 is a plan or top view; Fig. 2, a back elevation, and Fig. 3 a transverse section through A' A'.

To enable others skilled in the art to which my invention appertains to make and use the same, I will proceed to describe the construction and operation thereof.

Similar letters of reference represent corresponding parts of the drawings annexed.

Upon the drawings, A represents the frame of the machine, and L the axle upon which the wheels are fixed to transport the machine. B is the hopper-box for the grain, and C the hopper-box for the grass-seed.

Against the under side of the hopper-box B a series of brackets, Z, are fixed to support the shut-off valves $a$ and $b$. These brackets are "scarfed" both on their front and rear ends, so that the valves have room enough to play back and forth and against the under side of the hopper-box and on the said brackets. The valve $a$ is a long straight piece of metal, which is in length equal to the width of the machine, and which is connected to the bar $i$, to which the valves $b$ are also connected. The valves $b$ have a projection, $c$, on their back ends in the nature of a handle, that they may be conveniently removed, and they are attached to the bar $i$ by means of pins, which may be removed at pleasure, so as to allow the bar $i$ to move to and fro without affecting the position of the valves $b$, so that one or more of the said valves may be stopped, so that "point-rows" or irregular pieces of ground may be sowed without duplicating the seeding.

The grass-seed hopper is provided with a metallic bottom, $l$, which forms a part and parcel of the reflector $h$ by which the seed is spread and reflected backward under the machine. The regulating-slide $n$ of the grass-seed hopper is made to work close down upon the metallic bottom, so that no seed can accumulate in the receptacle between the bottom and the regulating-slide, as in the case of wooden bottoms.

To the valve-bars $i$ the angular lugs $d$ are fixed, which are operated upon by the ends $v'$ $v$ of the angular bracket Q, fixed to the chain-bar P for the purpose of opening and closing the valves $b$ and $a$. The chain-bar P is in the nature of an eccentric. It is fixed upon centers $y$, so that when it is raised by the bar or handle $f$ the chain I is wound around it, so as to raise the drill-point X out of the ground, and the end $v$ of the bracket Q is brought to act against the angular lug $d$, so as to close the seed-valves, and when the handle $f$ is lowered so as to let the drill-point X into the ground the end $v'$ of the bracket Q strikes against the lug $d$ on the inside and opens the valves.

R is the drag-bar, and D and H are tubes leading from the hopper B to the drill point or fluke X.

Having thus described the nature of my improved seeding-machine, what I claim as my invention, and desire to secure by Letters Patent, is—

The arrangement of the hook and cam-bracket Q on the bar P and with the bracket $d$ on the bar I to open and close the valves $b\ b$, in the manner set forth.

W. P. PENN.

Witnesses:
PH. HUFF,
FRANCIS D. BELCOUR.